(12) United States Patent
Marchioro

(10) Patent No.: US 6,182,611 B1
(45) Date of Patent: Feb. 6, 2001

(54) CONTAINER FOR CARRYING PETS

(75) Inventor: Domenico Marchioro, Fraz. Castelnovo (IT)

(73) Assignee: Marchioro S.p.A. Stampaggio Materie Plastische, Fraz. Castelnovo (IT)

( * ) Notice: Under 35 U.S.C. 154(b), the term of this patent shall be extended for 0 days.

(21) Appl. No.: 09/307,605

(22) Filed: May 10, 1999

(30) Foreign Application Priority Data

May 13, 1998 (IT) .......................................... PD98U0054 U

(51) Int. Cl.[7] ..................................................... A01K 1/02
(52) U.S. Cl. .................. 119/453; 119/497; D30/109; D30/114; D30/119; D30/120
(58) Field of Search ..................... 119/452, 453, 119/496, 497, 500, 501, 499; D30/109, 114, 119, 120

(56) References Cited

U.S. PATENT DOCUMENTS

| D. 308,588 | * | 6/1990 | Goetz . |
| D. 334,087 | * | 3/1993 | Goetz . |
| D. 364,712 | * | 11/1995 | Murphy et al. . |
| D. 367,734 | * | 3/1996 | Sharp . |
| D. 374,510 | * | 10/1996 | Barreto, III et al. . |
| 3,490,417 | * | 1/1970 | Swinney . |
| 3,710,761 | * | 1/1973 | Gregory . |
| 3,771,686 | * | 11/1973 | Brison . |
| 5,253,612 | * | 10/1993 | Goetz . |
| 5,357,900 | | 10/1994 | Ho . |
| 5,462,015 | | 10/1995 | Murphy . |
| 5,499,850 | | 3/1996 | Sharp . |
| 5,701,843 | * | 12/1997 | Lazides . |
| 5,960,744 | * | 10/1999 | Rutman . |

* cited by examiner

Primary Examiner—Michael J. Carone
Assistant Examiner—Daniel J. Beitey
(74) Attorney, Agent, or Firm—Guido Modiano; Albert Josif; Daniel O'Byrne

(57) ABSTRACT

A container for carrying pets which comprises a hollow body with a closeable access provided with at least one opening which is blocked by a grille; the grille is fixed to the rim of the at least one opening by means of rivets, the body being shaped, at the opening, so as to form a perimetric fold for peripherally supporting by abutment the grille which is provided with a plurality of holes for the insertion and retention of the rivets.

36 Claims, 7 Drawing Sheets

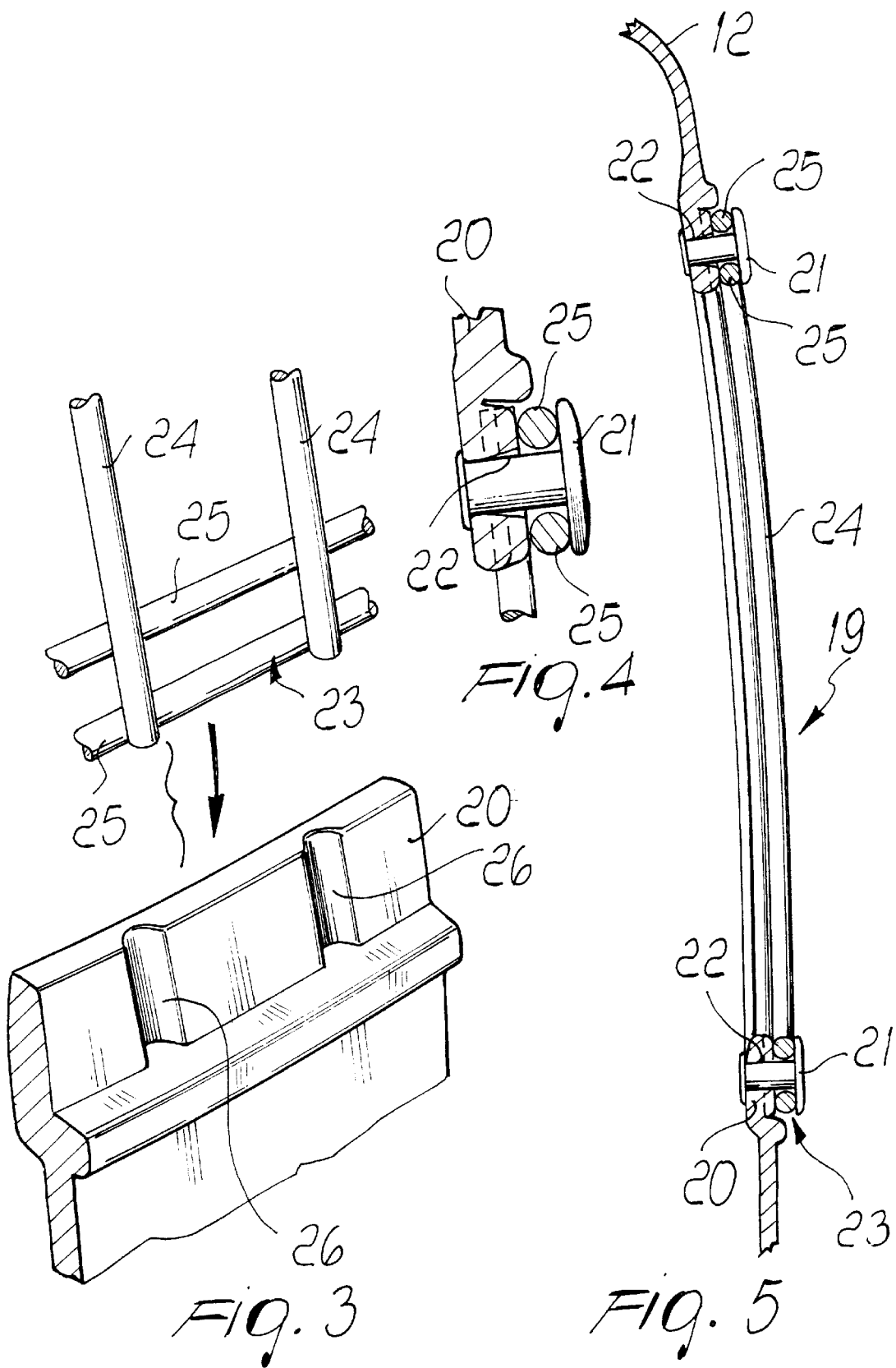

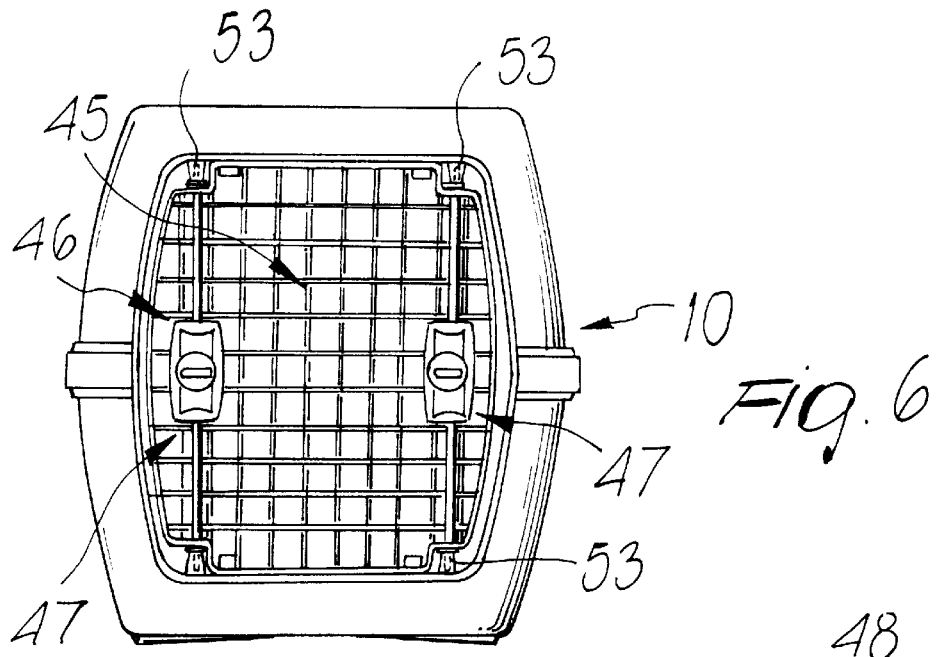
Fig. 6
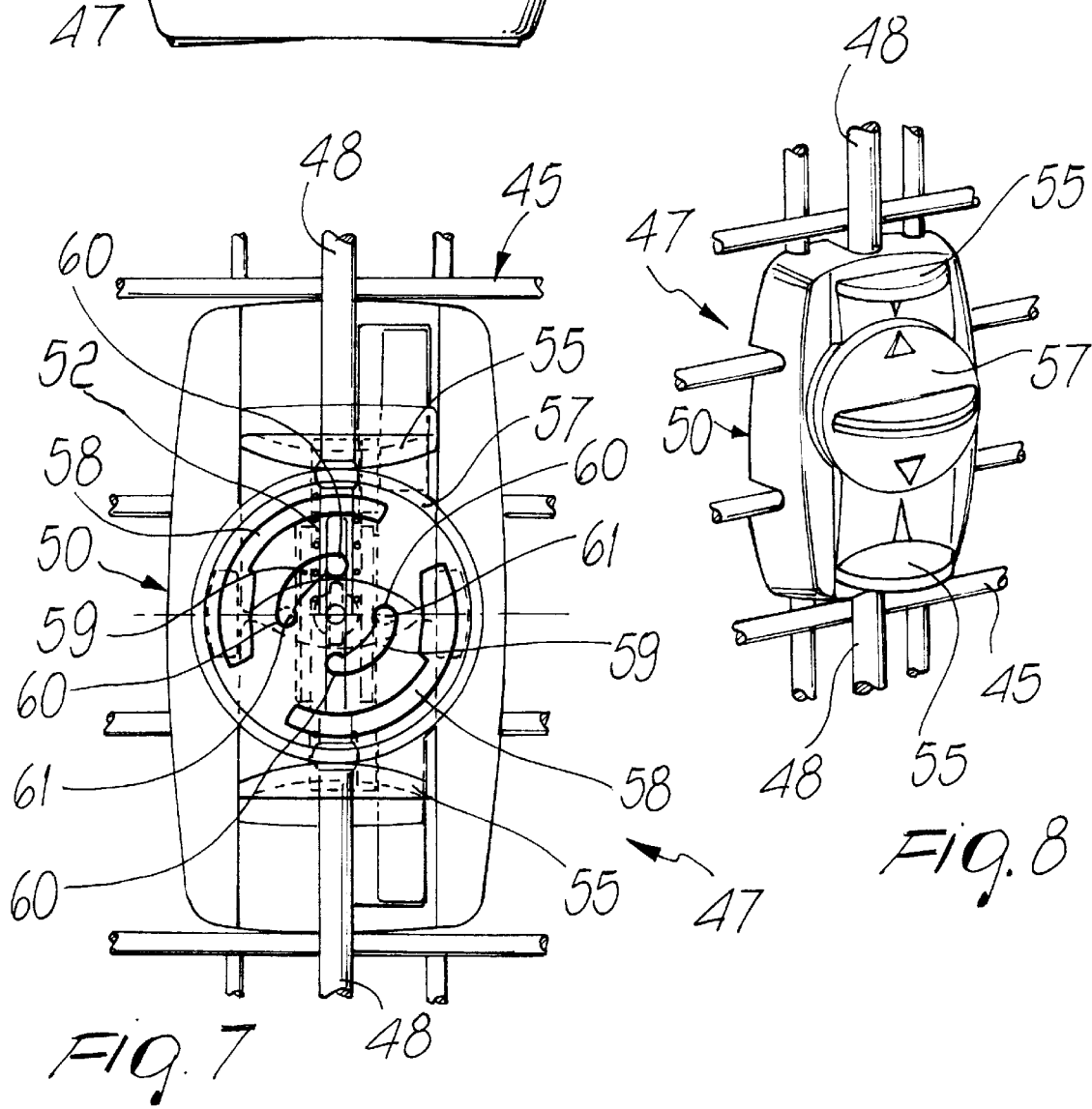
Fig. 7
Fig. 8

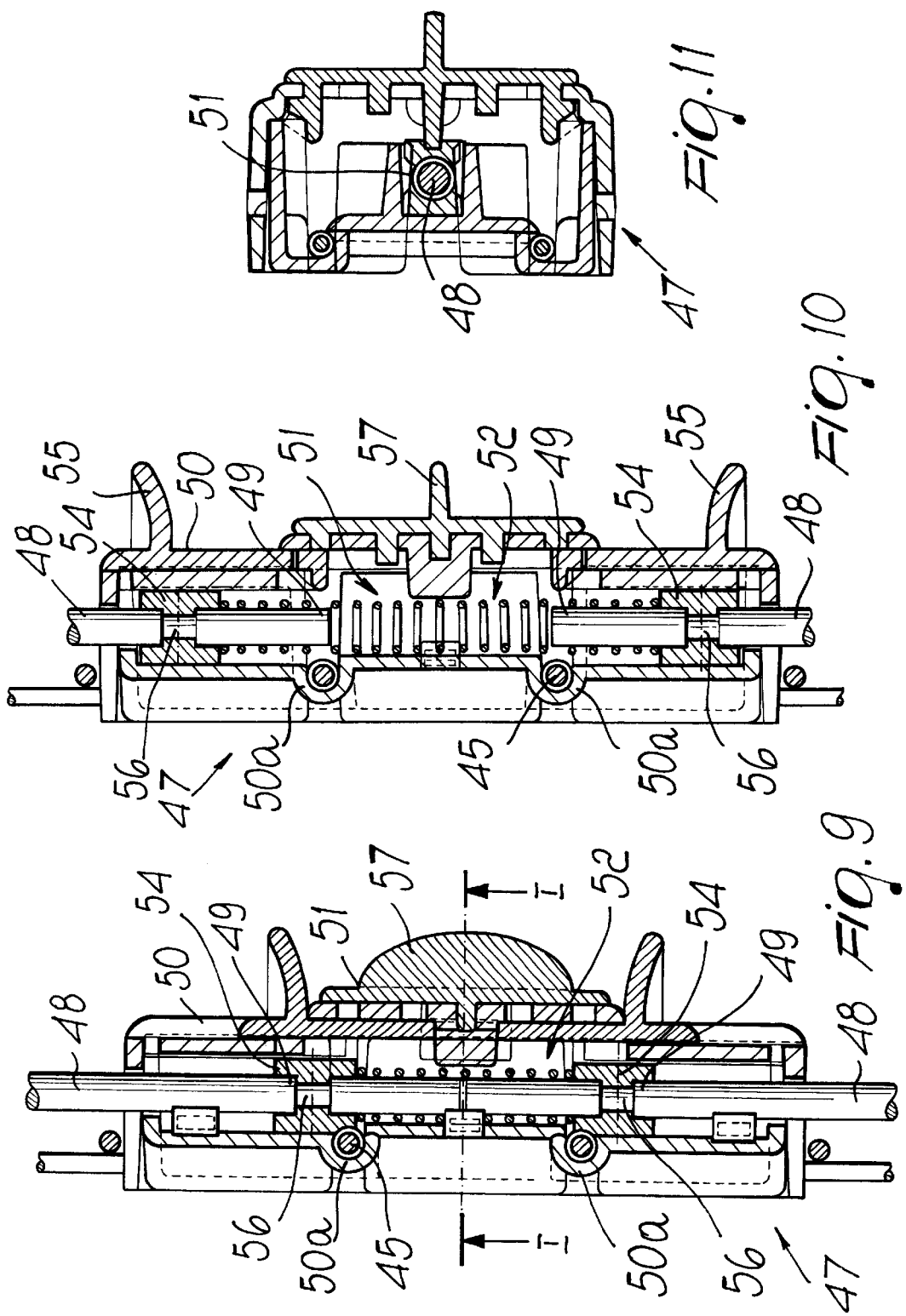

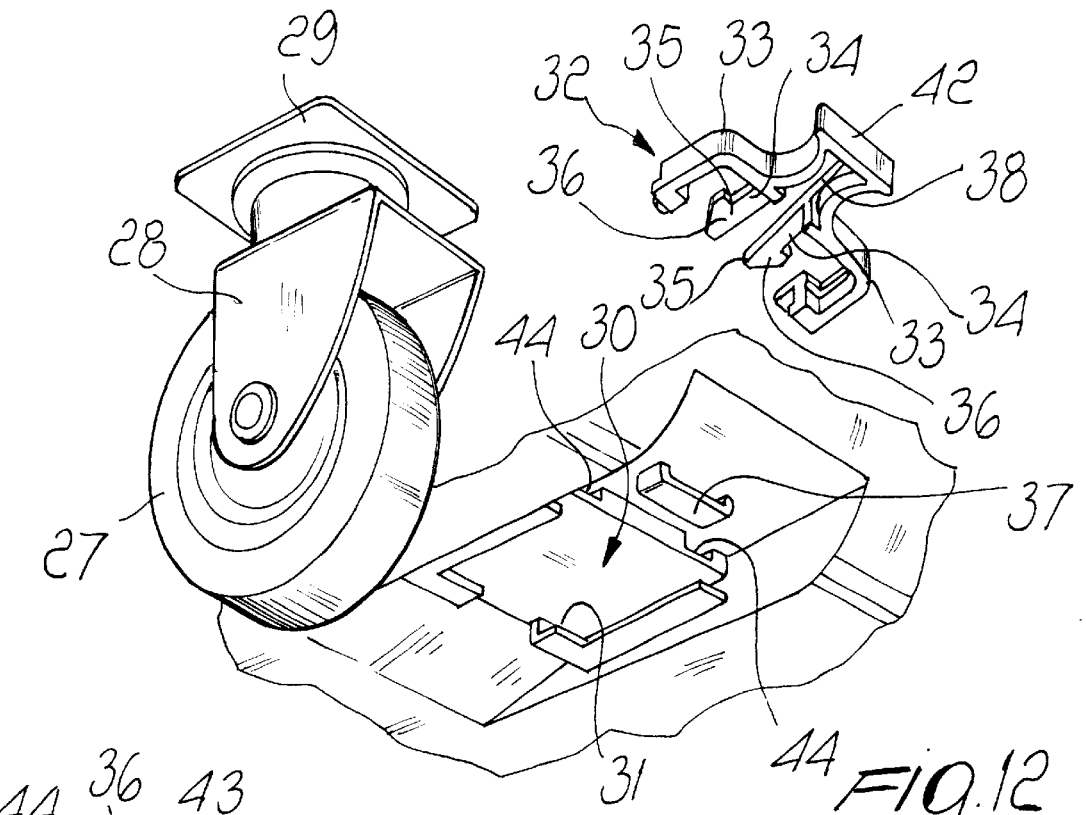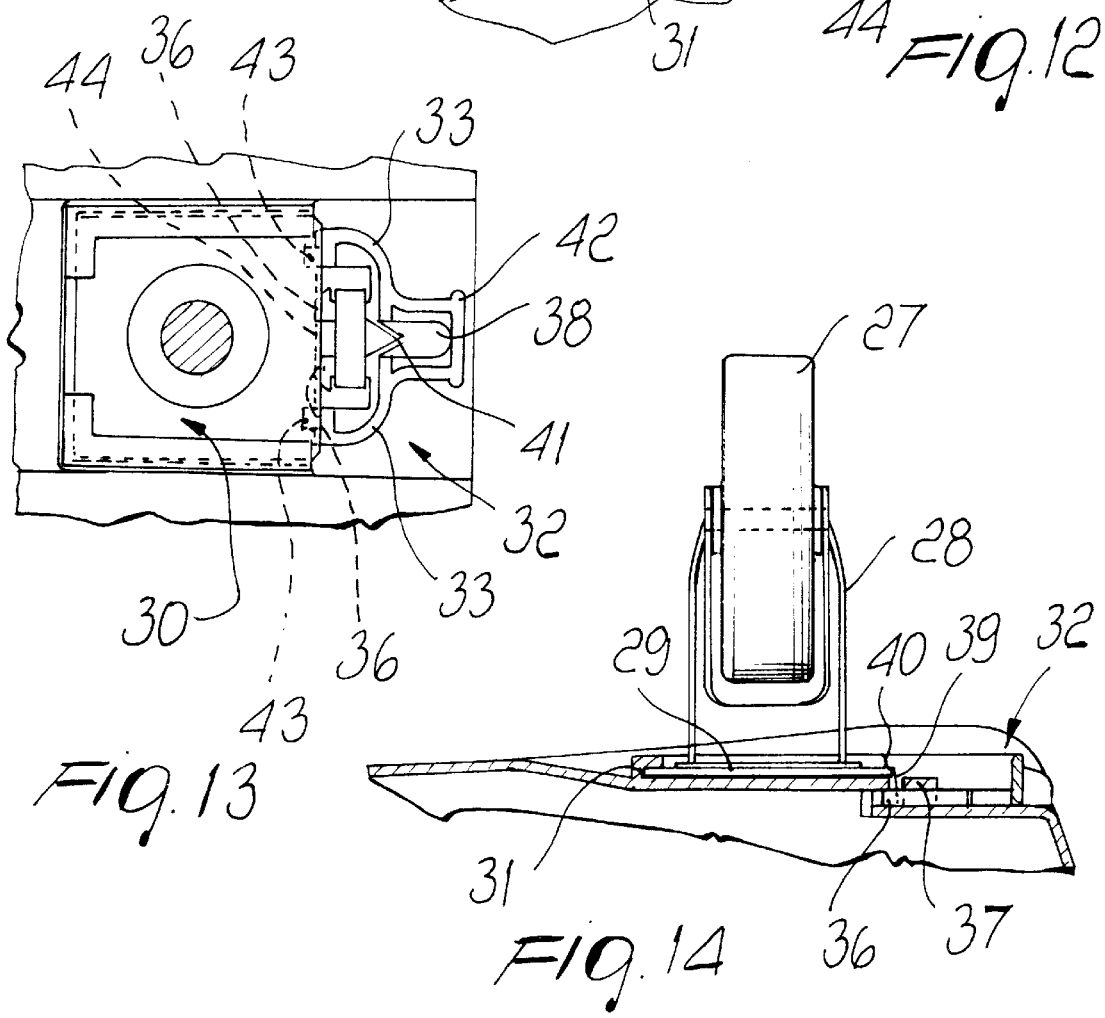

CONTAINER FOR CARRYING PETS

BACKGROUND OF THE INVENTION

The present invention relates to a container for carrying pets.

The container is particularly adapted for small, medium and large pets.

It is known that it is often necessary to carry pets, for example to take them to a veterinarian or when going on vacation or in any case moving to a place other than one's usual residence.

In order to carry pets so as to prevent them from suffering while preventing their escape, with the danger of injury to the pets and to other parties, containers have been conceived constituted by a structurally rather tough hollow body which is spacious enough to contain the pets, has a closeable access, and is provided with at least one opening (although more than one is usually provided) blocked by grilles which are either obtained monolithically from the container or which are applied in a subsequent step.

This type of container, although functionally achieving its intended tasks, currently has structural drawbacks and some inconveniences in operation.

In particular, from the constructive point of view, some components, such as the grilles applied to the openings, require labor-intensive assembly and fixing procedures which are not entirely efficient from the point of view of production.

Some components of conventional containers furthermore force the user to perform particularly complicated and labor-intensive operations.

SUMMARY OF THE INVENTION

The aim of the present invention is to provide a container for carrying pets which solves the above problems of conventional containers, particularly by being provided with components which allow to achieve savings in terms of production cycle, with a corresponding cost reduction for an equal level of resulting quality and functionality.

In relation to this aim, an important object of the present invention is to provide a container which has components organized so as to make it easier and faster to perform the operations assigned to the user, such as for example introducing and removing the pet and closing or locking components designed to prevent the escape of said pet.

Another object of the present invention is to provide a container which can be manufactured at competitive costs with respect to conventional containers and whose structure can be adapted to different pets.

Another object of the present invention is to provide a container which allows to provide a microenvironment inside it which is particularly comfortable and adapted for carrying animals without making them suffer.

Another object of the present invention is to provide a container which is simple and easy to carry and for which transfer from various transportation means is also facilitated.

This aim, these objects and others which will become apparent hereinafter are achieved by a container for carrying pets, comprising a hollow body with a closeable access provided with at least one opening which is blocked by a grille, characterized in that said grille is fixed to a rim of said at least one opening by means of rivets, said body being shaped, at the opening, so as to form a perimetric fold for peripherally supporting by abutment said grille, said perimetric fold being provided with a plurality of holes for the insertion and retention of said rivets.

BRIEF DESCRIPTION OF THE DRAWINGS

Further characteristics and advantages of the container according to the present invention will become apparent from the description of an embodiment thereof, illustrated only by way of non-limitative example in the accompanying drawings, wherein:

FIG. 3 is a perspective view of another detail of the container of FIG. 1;

FIG. 4 is a sectional view of a detail of the container of FIG. 1;

FIG. 5 is another sectional view of the detail of FIG. 2;

FIG. 6 is a front view of the container of FIG. 1;

FIGS. 7 and 8 are respectively a front view and a perspective view of a same detail of the container of FIG. 1;

FIGS. 9 and 10 are sectional views of the detail of FIG. 7;

FIG. 11 is a sectional view, taken along the plane I—I, of the detail of FIG. 9;

FIG. 12 is an exploded perspective view of another detail of the container of FIG. 1;

FIGS. 13 and 14 are views of the detail of FIG. 12;

DESCRIPTION OF THE PREFERRED EMBODIMENTS

Figure 1:
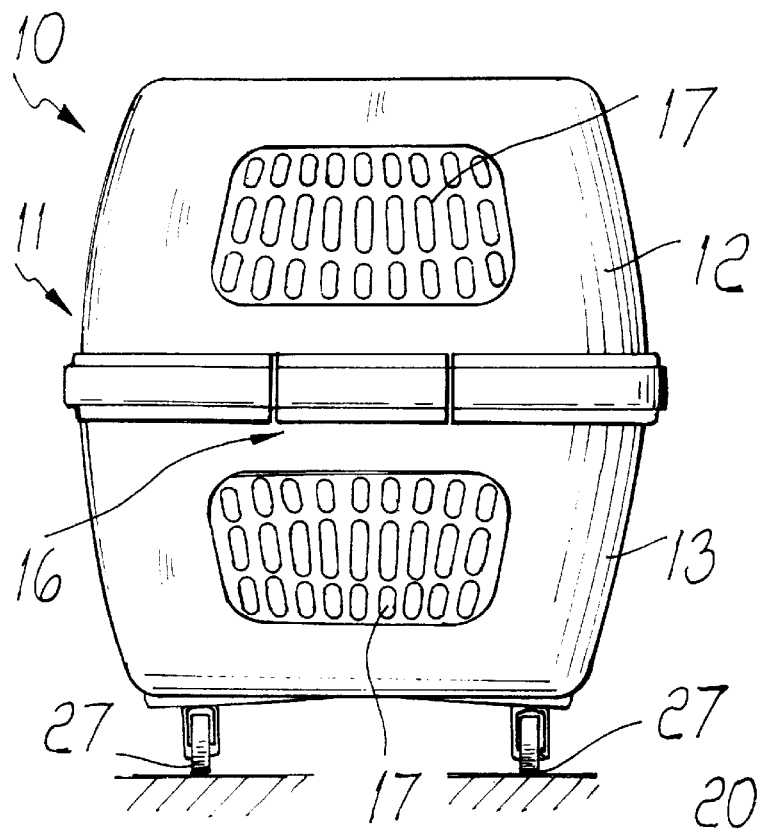
FIG. 1 is an elevation view of a container according to the invention.
Figure 2:
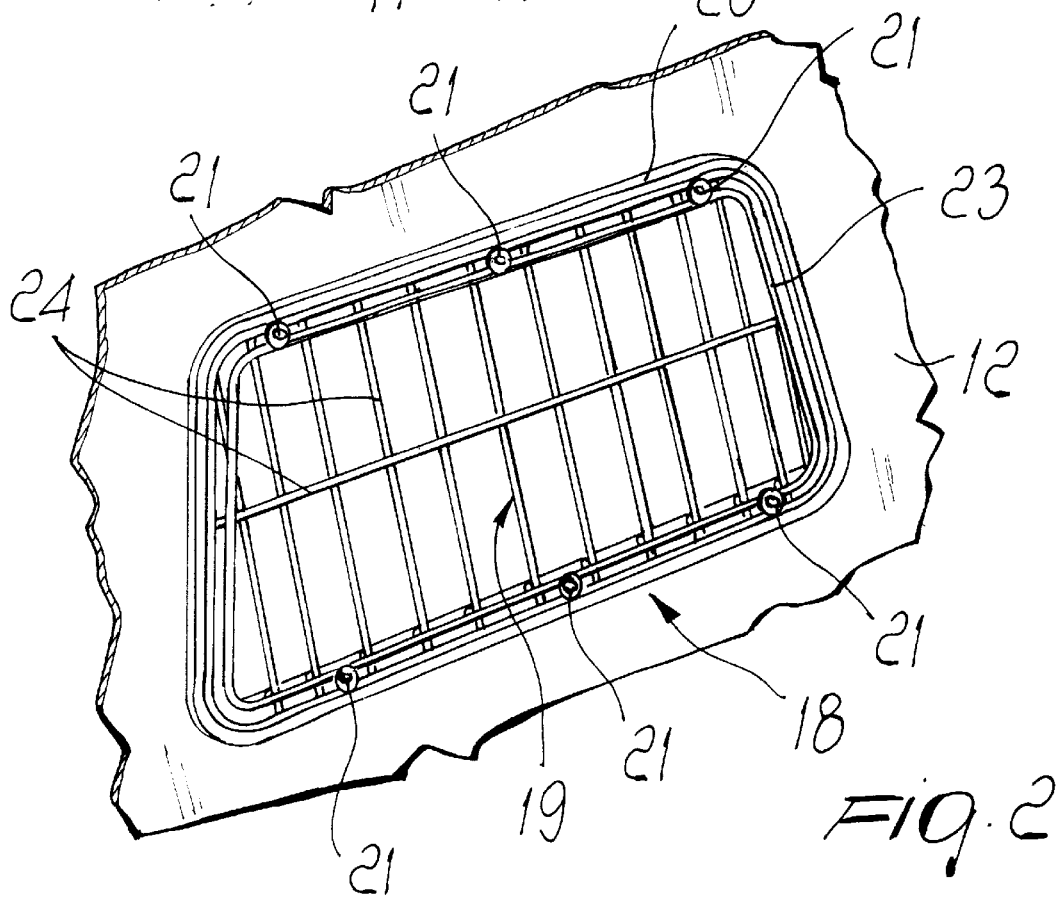
FIG. 2 is a perspective view of a detail of the container of FIG. 1.
Figure 15:
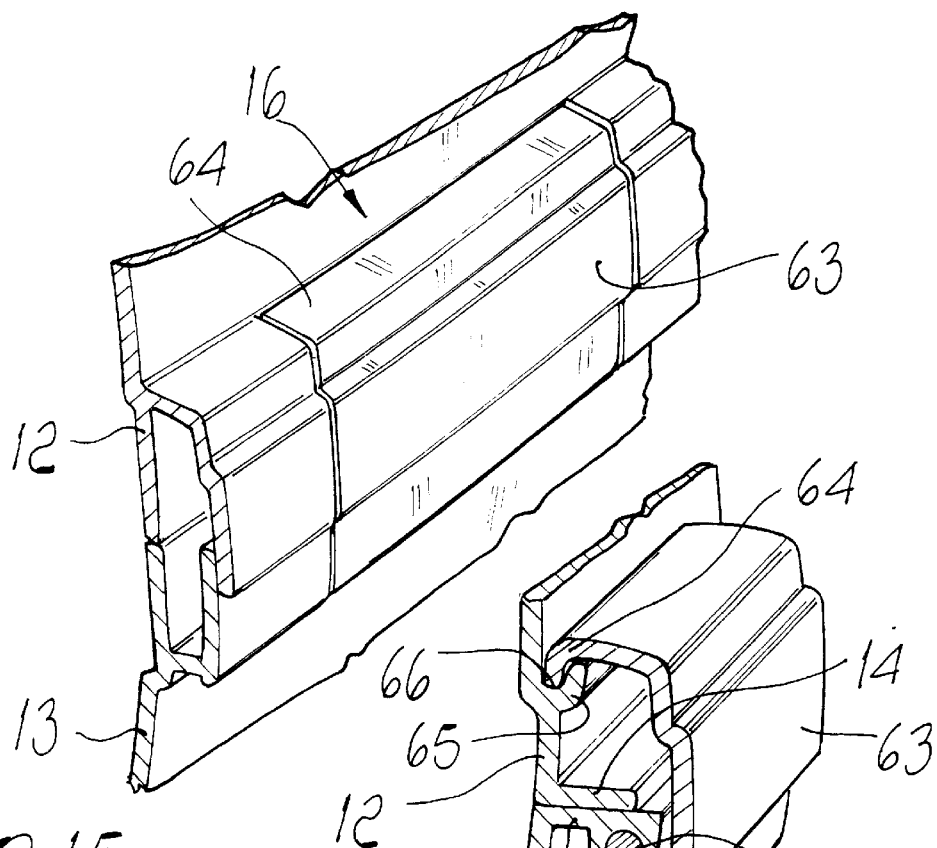
FIG. 15 is a perspective sectional view of another detail of the container of FIG. 1.
Figure 16:
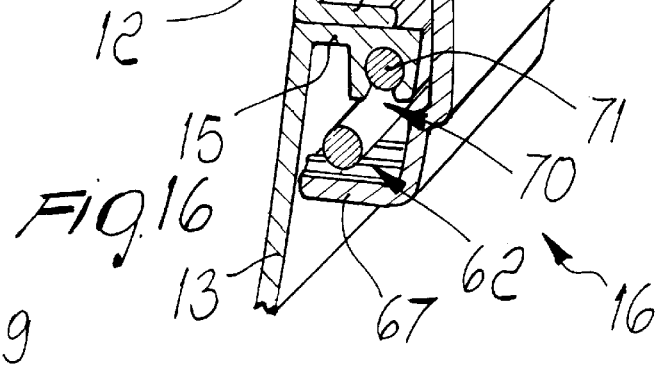
FIG. 16 is a perspective sectional view of the detail of FIG. 15.
Figure 17:
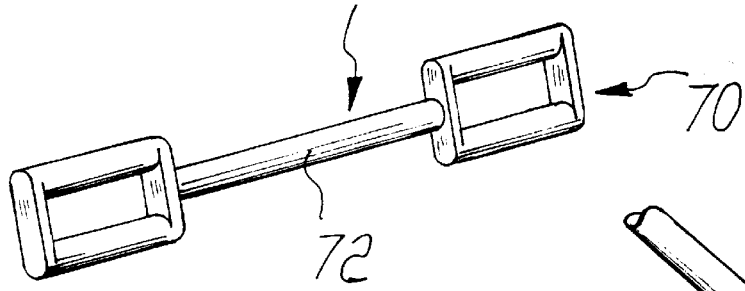
FIG. 17 is a perspective view of a component of the detail of FIG. 15.
Figure 18:
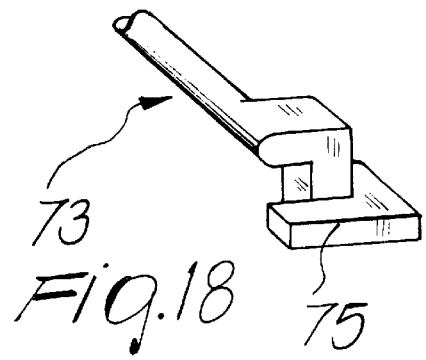
FIG. 18 is a perspective view of another component of the detail of FIG. 15.
Figure 19:
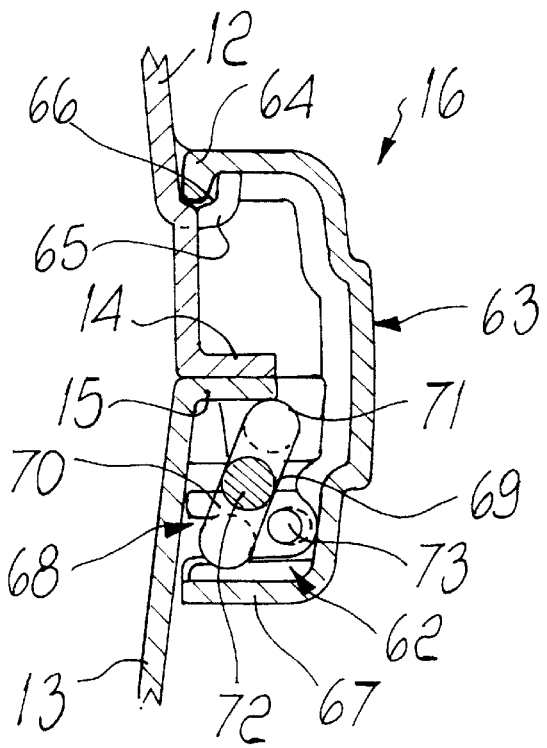
FIGS. 19 and 20 are sectional views, taken along different sectional planes, of the detail of FIG. 15.
Figure 20:
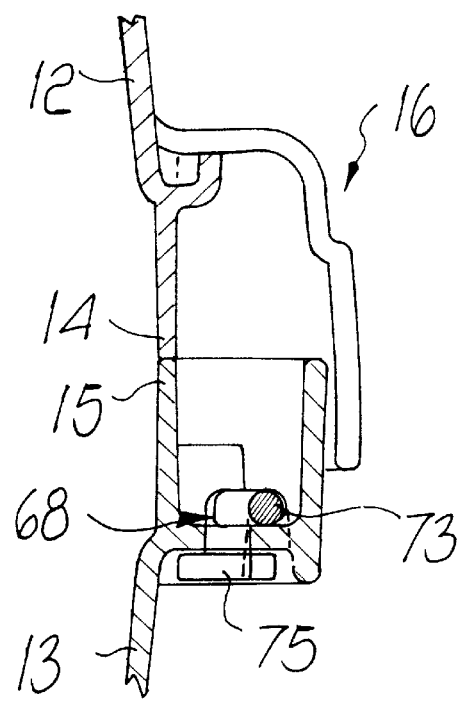
Figure 21:
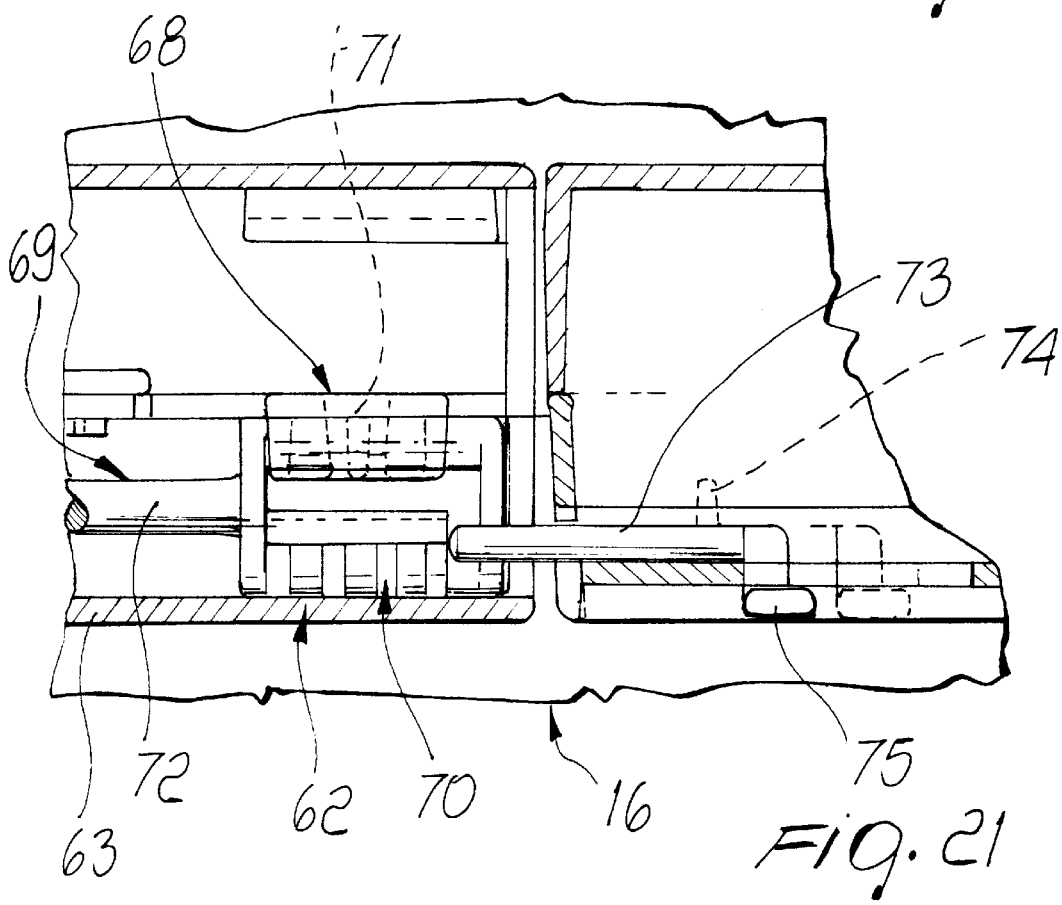
FIG. 21 is another sectional view of the detail of FIG. 15.

With reference to FIGS. 1 to 21, a container for carrying pets according to the invention is generally designated by the reference numeral 10.

In particular, the container 10 comprises a hollow body 11 which is constituted, in this case, by two half-shells, respectively an upper one 12 and a lower one 13, which are mutually in contact along respective edges 14. and 15 (see FIG. 19) and are locked by reversible fastening means 16 which are described in greater detail hereinafter.

In particular, the body 11 has, in this case, a plurality of openings, some of which, designated by the reference numeral 17, are obtained monolithically from the body 11, while at least one opening, designated by the reference numeral 18, is blocked by a grille generally designated by the reference numeral 19.

In particular, the grille 19 is fixed to the rim 20 that forms the opening 18 by means of rivets 21.

More specifically, the body 11 is shaped at the opening 18 so as to define, by means of the perimetric fold 20, a peripheral abutment support for the grille 19.

The perimetric fold 20 is provided with a plurality of holes 22 for the insertion and retention of rivets 21.

The grille is constituted in this case by a frame 23 which is shaped substantially complementarily to the corresponding opening 18 and to which cross-members, all designated by the reference numeral 24, are fixed.

In particular, in this case the frame 23 is constituted by two mutually parallel and spaced rods 25; in particular, the rivets 21 are inserted between said rods 25, and the head of each of the rivets 21 keeps the corresponding frame portion 23 packed against the rim 20.

The rim 20 also has slots 26 for the guided accommodation of the ends of the vertical cross-members 24 (see FIG. 3).

In this embodiment, the container 10 is wheeled.

In particular, it is provided with four wheels 27 which are applied detachably to the lower half-shell 13.

Each one of the wheels 27 is rotatably pivoted to a fork 28 fixed to a base 29, which in this case is substantially plate-like; the base is detachably anchored to the bottom of the body 11 and more specifically to the bottom of the lower half-shell 13.

There are also means for the reversible locking of the base 29 to the bottom of the lower half-shell 13; such means are described hereinafter.

The base 29 is accommodated in a corresponding first seat 30 which is constituted by flaps which protrude monolithically from the bottom of the lower half-shell 13 and define undercuts 31 for perimetric support and for base 29 (see FIG. 12).

In particular, the locking means, applied in the same direction in which the base 29 is inserted, are substantially constituted by a clip element 32 which is provided with two outer wings 33 for guiding its insertion and with two inner wings 34 which have ends 35 provided with mutually opposite hooks 36 for locking within a loop 37 arranged monolithically in front of, and proximate to, the front along which the base 29 is inserted in the first seat 30.

In particular, the clip element 32 is made of flexible material and is also shaped so as to form an axial slit 38 in order to flex during insertion and extraction.

In particular, the clip element 32 defines a front surface 39 for locking the base 29.

In this case, furthermore, surface 39 continues with a lower fold 40 which is adapted to ensure better stability of the base 29 within the first seat 30.

Moreover, the clip element 32 is provided, at the slit 38, with a stiffening bridge 41 and with a grip tang 42 which is available to the user.

A corresponding stud 43 also protrudes, at the free ends of each one of wings 33, for guided insertion in a recess 44 formed correspondingly in the body 11 (see FIGS. 13 and 14).

The container 10 is also provided with an access door 45 which is in turn provided with closure means 46.

In this case, the door 45 is provided with a grille and the closure means are constituted by two identical closure devices, designated by the reference numeral 47, each of which is constituted by two mutually opposite and coaxial rods 48, with corresponding ends 49 inserted in a common base block 50 which is hollow and is fixed to the door 45 by means of couplings 50a.

In particular, each one of the ends 49 of the rods 48 is inserted in a common second seat 51 formed inside the block 50, which also accommodates elastic contrast means in this case constituted by a corresponding helical spring 52 which is adapted to keep the corresponding rod 48 pushed outwards.

Each one of the devices 47 is also provided with safety means for closure and with means for opening the rods 48, whose free ends, when normally closed, are inserted in corresponding seats 53 formed in the body 11.

In particular, the opening means are constituted, for each one of the devices 47, by two sliders 54 with a respective lever 55 available to the user for actuation; one slider is provided for each corresponding rod 48, and the sliders are slidingly associated with the block 50, each one being coupled, for movement, to a corresponding annular slot 56 provided in the corresponding rod 48.

The safety means are instead constituted by a knob 57 which is pivoted to the block 50 and is provided with circular raised portions 58 which have a coaxial curvature, are arranged mutually opposite and are adapted to be arranged, in the safety mode, in abutment against surfaces of the end arranged inside the block 50 of the corresponding rod 48 and prevent its retraction, while in the disengaged mode they are adapted to form a channel for the free sliding of the sliders 54 for actuation.

The knob 57 also comprises two slots 59 which lie substantially concentrically with respect to the raised portions 58; each slot has ends which form seats 60 for stably accommodating a pin 61 inserted therein, which protrudes from block 50.

The pins 61 are adapted to define, together with the corresponding slots. 59, at least two stable positions for the knob 57; one is a safety position and the other one is a disengagement position.

In this case, the fastening means 16 are constituted by a fastening device, generally designated by the reference numeral 62, located opposite the door 45.

Device 62 is composed of a hollow plate 63 having a folded end 64 which is adapted to couple, in an upward region, to a corresponding folded perimetric portion 65 of the upper half-shell 12 which substantially forms a pocket 66.

The opposite end 67 of the plate 63 is closed reversibly in a downward region by locking means which are generally designated by the reference numeral 68.

The reversible locking means 68 are constituted, in this case, by a shaped element 69 constituted by two heads which form two linkages 70 pivoted in corresponding seats 71 which are formed monolithically at the perimetric fold 15 of the lower half-shell and are mutually connected by a cross-member 72.

In particular, the free portion of each one of the linkages 70, by jamming against the internal surface of the lower end 67 of the plate 63, locks it, by being arranged, together with the pivoted portion, along a directrix which converges toward the surface of the body 11 and therefore ultimately with a self-locking thrusting action.

The locking means comprise a safety pivot 73 (see FIG. 21) which can be inserted in holes formed in the lower half-shell 13 and in the plate 63 and is adapted to be arranged, when in the locking mode, so as to rest on the opposite portion of one of the linkages 70 relative to the one that faces the body 11.

The closure pivot 73 is also provided with a stroke limiting tab 74, shown in dashed lines in the Figures, and with a head 75 which is available to the user's action and can be moved along a shaped slotted hole which is not shown.

In practice it has been observed that the present invention has achieved the intended aim and objects.

In particular, attention is drawn to the extreme functional efficiency of the components that constitute the container according to the invention, which allows considerable production savings while offering the user an easier use of the container as a whole.

It should also be noted that the container according to the invention has a particularly flexible structure which can therefore be adapted to various types of animal and application requirement.

It should also be noted that the container according to the invention allows to ensure that the pet has a particularly ventilated, well-lit and comfortable microenvironment without however renouncing safety conditions for the user as well.

The present invention is susceptible of modifications and variations within the scope of the inventive concept.

The materials and the dimensions may be any according to requirements.

The technical details may be replaced with other technically equivalent elements.

The disclosures in Italian Utility Model Application No. PD98U000054 from which this application claims priority are incorporated herein by reference.

What is claimed is:

1. A container for carrying pets, of the type which comprises a hollow body with a closeable access provided with at least one opening which is blocked by a grille, wherein said grille is fixed to a rim of said at least one opening by means of rivets, said body being shaped, at the opening, so as to define a perimetric fold for peripherally supporting by abutment said grille, said perimetric fold being provided with a plurality of holes for the insertion and retention of said rivets, said grille being constituted by a frame which is shaped substantially complementarily to the corresponding at least one opening and to which cross-members are fixed, wherein said frame is constituted by two mutually parallel and spaced rods.

2. The container according to claim 1, wherein said rivets are inserted between said rods, the head of each one of said rivets keeping the corresponding frame portion packed against said perimetric fold.

3. The container for carrying pets according to claim 1, further comprising a plurality of wheels, each wheel being rotatably pivoted to a fork fixed to a base which is reversibly anchored to the bottom of said container, means for the reversible locking of said base to said container being provided.

4. The container according to claim 3, wherein said wheel base is plate-shaped and accommodated in a corresponding first seat which is constituted by flaps which protrude monolithically from the bottom of said container and form undercuts for the perimetric support of said base.

5. The container according to claim 4, comprising locking means which are applied in a direction in which said wheel base is inserted in the corresponding first seat.

6. The container according to claim 5, wherein said locking means are constituted, for each one of said wheel bases, by a corresponding clip element which is made of flexible material and is provided with two outer insertion guiding wings and with two inner wings with ends provided with mutually opposite hooks for locking within a loop arranged at the front, proximate to a region where said base is inserted in said first seat.

7. The container according to claim 6, wherein said clip element defines a front locking surface for the corresponding wheel base.

8. The container according to claim 7, wherein said front locking surface defined by said clip element is provided, in a downward region, with a perimetric fold which is adapted to form a further lower support for said wheel base.

9. The container according to claim 6, wherein said clip element has a shaped body so as to form an axial slit for flexing during insertion and extraction.

10. The container according to claim 6, wherein said clip element comprises a grip tang to be operated by a user.

11. The container according to claim 6, wherein a stud protrudes from each one of said outer wings and can be inserted in a corresponding hollow formed in said body.

12. The container according to claim 1, comprising an access door with closure means which are constituted by at least one closure device formed by two mutually opposite rods whose ends are inserted in a common seat which is formed in an equally common hollow base block in which elastic means keep said rods pushed outwards, the other end of each one of said rods being inserted, during closure, in a seat formed in said body, means for opening said rods and means for closing said rods being provided.

13. The container according to claim 12, wherein said opening means are constituted, for said at least one closure device, by two sliders with levers available for actuation by the user, each slider being provided for a corresponding rod, being slidingly associated with said block and being coupled, for movement, to a corresponding annular slot formed in a corresponding rod.

14. The container according to claim 13, wherein said safety means are provided for said opening means and said closure device, said safety means being constituted by a knob which is pivoted to said block and is provided with circular raised portions which have a coaxial curvature, are mutually opposite and are adapted to be arranged, in the safety mode, in abutment against corresponding head surfaces of the corresponding rods which are located inside said block, in order to prevent their retraction, said raised portions being adapted to define, when disengaged, a channel for free sliding under the action of said sliders.

15. A container according to claim 14, wherein two mutually opposite slots are also formed in said knob and lie concentrically with respect to said circular raised portions, each slot having, at its ends, stable accommodation seats for a corresponding pivot inserted therein which protrudes from said block and is adapted to define, together with said corresponding slot, at least two stable positions for said knob, a safety position and a disengagement position.

16. The container according to claim 1, wherein said body is constituted by two half-shells which are reversibly connected, at their ends, by fastening means which comprise at least one fastening device which is composed of a hollow plate provided with a folded end which is adapted to couple, in an upward region, to a corresponding folded perimetric portion of said upper half-shell which substantially forms a pocket, an opposite end of the plate being closed in a downward region and reversibly by locking means.

17. The container according to claim 16, wherein said reversible locking means are constituted by a shaped element which is generally constituted by two heads which form two linkages pivoted in corresponding seats formed monolithically at the perimetric fold of the lower half-shell and mutually connected by a cross-member, a free portion of each one of the linkages being adapted to jam against an internal surface of a lower end of said plate, locking it and being arranged, together with the pivoted portion, along a directrix which converges toward the surface of the body and therefore ultimately provides a self-locking thrust.

18. The container according to claim 17, wherein said locking means comprise a safety pivot which can be inserted in holes provided in said lower half-shell and in said plate and is adapted to be arranged, during locking, so as to rest on the opposite portion of one of said linkages with respect to the one that faces the body, said closure pivot being also provided with a stroke limiting tab and with a head which is available for the action of the user and can be moved along a shaped slotted hole.

19. A container for carrying pets, of the type which comprises a hollow body with a closeable access provided with at least one opening which is blocked by a grille, wherein said grille is fixed to a rim of said at least one opening by means of rivets, said body being shaped, at the opening, so as to define a perimetric fold for peripherally supporting by abutment said grille, said perimetric fold being provided with a plurality of holes for the insertion and retention of said rivets, the container further comprising a plurality of wheels, each wheel being rotatably pivoted to a fork fixed to a base which is reversibly anchored to the bottom of said container, means for the reversible locking of said base to said container being provided, and wherein said wheel base is plate-shaped and accommodated in a corresponding first seat which is constituted by flaps which protrude monolithically from the bottom of said container and form undercuts for the perimetric support of said base.

20. The container according to claim 19, wherein said grille is constituted by a frame which is shaped substantially complementarily to the corresponding at least one opening and to which cross-members are fixed.

21. The container according to claim 19, wherein said frame is constituted by two mutually parallel and spaced rods.

22. The container according to claim 19, wherein said rivets are inserted between said rods, the head of each one of said rivets keeping the corresponding frame portion packed against said perimetric fold.

23. The container according to claim 19, comprising locking means which are applied in a direction in which said wheel base is inserted in the corresponding first seat.

24. The container according to claim 23, wherein said locking means are constituted, for each one of said wheel bases, by a corresponding clip element which is made of flexible material and is provided with two outer insertion guiding wings and with two inner wings with ends provided with mutually opposite hooks for locking within a loop arranged at the front, proximate to a region where said base is inserted in said first seat.

25. The container according to claim 24, wherein said clip element defines a front locking surface for the corresponding wheel base.

26. The container according to claim 25, wherein said front locking surface defined by said clip element is provided, in a downward region, with a perimetric fold which is adapted to form a further lower support for said wheel base.

27. The container according to claim 26, wherein said clip element has a shaped body so as to form an axial slit for flexing during insertion and extraction.

28. The container according to claim 24, wherein said clip element comprises a grip tang to be operated by a user.

29. The container according to claim 24, wherein a stud protrudes from each one of said outer wings and can be inserted in a corresponding hollow formed in said body.

30. The container according to claim 19, comprising an access door with closure means which are constituted by at least one closure device formed by two mutually opposite rods whose ends are inserted in a common seat which is formed in an equally common hollow base block in which elastic means keep said rods pushed outwards, the other end of each one of said rods being inserted, during closure, in a seat formed in said body, means for opening said rods and means for closing said rods being provided.

31. The container according to claim 30, wherein said opening means are constituted, for said at least one closure device, by two sliders with levers available for actuation by the user, each slider being provided for a corresponding rod, being slidingly associated with said block and being coupled, for movement, to a corresponding annular slot formed in a corresponding rod.

32. The container according to claim 31, wherein said safety means are provided for said opening means and said closure device, said safety means being constituted by a knob which is pivoted to said block and is provided with circular raised portions which have a coaxial curvature, are mutually opposite and are adapted to be arranged, in the safety mode, in abutment against corresponding head surfaces of the corresponding rods which are located inside said block, in order to prevent their retraction, said raised portions being adapted to define, when disengaged, a channel for free sliding under the action of said sliders.

33. A container according to claim 32, wherein two mutually opposite slots are also formed in said knob and lie concentrically with respect to said circular raised portions, each slot having, at its ends, stable accommodation seats for a corresponding pivot inserted therein which protrudes from said block and is adapted to define, together with said corresponding slot, at least two stable positions for said knob, a safety position and a disengagement position.

34. The container according to claim 33, wherein said reversible locking means are constituted by a shaped element which is generally constituted by two heads which form two linkages pivoted in corresponding seats formed monolithically at the perimetric fold of the lower half-shell and mutually connected by a cross-member, a free portion of each one of the linkages being adapted to jam against an internal surface of a lower end of said plate, locking it and being arranged, together with the pivoted portion, along a directrix which converges toward the surface of the body and therefore ultimately provides a self-locking thrust.

35. The container according to claim 19, wherein said body is constituted by two half-shells which are reversibly connected, at their ends, by fastening means which comprise at least one fastening device which is composed of a hollow plate provided with a folded end which is adapted to couple, in an upward region, to a corresponding folded perimetric portion of said upper half-shell which substantially forms a pocket, an opposite end of the plate being closed in a downward region and reversibly by locking means.

36. The container according to claim 34, wherein said locking means comprise a safety pivot which can be inserted in holes provided in said lower half-shell and in said plate and is adapted to be arranged, during locking, so as to rest on the opposite portion of one of said linkages with respect to the one that faces the body, said closure pivot being also provided with a stroke limiting tab and with a head which is available for the action of the user and can be moved along a shaped slotted hole.

* * * * *